United States Patent
Porat

(10) Patent No.: US 10,255,120 B2
(45) Date of Patent: Apr. 9, 2019

(54) METHOD AND CONTROLLER FOR CHAINING APPLICATIONS IN A SOFTWARE DEFINED NETWORK

(71) Applicant: Huawei Technologies Co., Ltd., Shenzhen (CN)

(72) Inventor: Hayim Porat, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 15/174,006

(22) Filed: Jun. 6, 2016

(65) Prior Publication Data

US 2016/0283290 A1    Sep. 29, 2016

Related U.S. Application Data

(63) Continuation of application No. PCT/EP2014/055571, filed on Mar. 20, 2014.

(30) Foreign Application Priority Data

Dec. 6, 2013   (WO) ................ PCT/EP2013/075800

(51) Int. Cl.
*H04L 29/02* (2006.01)
*G06F 9/54* (2006.01)
*H04L 29/08* (2006.01)

(52) U.S. Cl.
CPC ............... *G06F 9/54* (2013.01); *H04L 67/10* (2013.01); *H04L 67/2838* (2013.01)

(58) Field of Classification Search
CPC .......................................................... G06F 9/54
See application file for complete search history.

(56) References Cited

U.S. PATENT DOCUMENTS

| 2011/0238942 | A1 | 9/2011 | Meiners |
| 2012/0239727 | A1 | 9/2012 | Dutta et al. |

(Continued)

FOREIGN PATENT DOCUMENTS

| CN | 103095565 A | 5/2013 |
| CN | 103314557 A | 9/2013 |

(Continued)

OTHER PUBLICATIONS

Ying Zhang et al. "StEERING: A Software-Defined Networking for Inline Service Chaining", Publication Date Oct. 1, 2013 (Year: 2013).*

(Continued)

*Primary Examiner* — Brian W Wathen
*Assistant Examiner* — Abdou K Seye
(74) *Attorney, Agent, or Firm* — Leydig, Voit & Mayer, Ltd.

(57) ABSTRACT

A method and a software defined network (SDN) controller for chaining applications in a SDN. A service data table is created in the SDN controller. In the service data table a plurality of applications are associated with a plurality of application types. Furthermore, at least one service chain is created in the SDN controller. The at least one service chain defines an order of application types running on the SDN controller. At least one application is registered to the service chain based on its application type as associated with the application in the service data table.

29 Claims, 9 Drawing Sheets

(56) References Cited

U.S. PATENT DOCUMENTS

| | | | |
|---|---|---|---|
| 2013/0163475 A1 | 6/2013 | Beliveau et al. | |
| 2013/0272305 A1 | 10/2013 | Lefebvre et al. | |
| 2013/0304915 A1 | 11/2013 | Kawai | |
| 2014/0280950 A1* | 9/2014 | Bhanujan | H04L 67/1002 709/226 |
| 2014/0369348 A1* | 12/2014 | Zhang | H04L 45/121 370/389 |
| 2015/0092551 A1* | 4/2015 | Moisand | H04L 12/4633 370/235 |

FOREIGN PATENT DOCUMENTS

| | | |
|---|---|---|
| CN | 103326884 A | 9/2013 |
| CN | 103338163 A | 10/2013 |
| WO | 2006090369 A1 | 8/2006 |

OTHER PUBLICATIONS

Fulvio Risso et al. "Some Controversial Opinions on Software-Defined Data Plane Services" Jan. 9, 2013 (Year: 2013).*

Das et al., "An Agent-based Modeling Approach of Network Migration to New Technologies," IEEE ICC 2013—Communication QoS, Reliability and Modeling Symposium, pp. 2583-2588, Institute of Electrical and Electronics Engineers, New York, New York (2013).

Fernando et al., "Virtual Topologies for Service Chaining in BGP IP VPNs," Internet-Draft, Internet Engineering Task Force, Reston, Virginia (Jul. 15, 2013).

"Software-defined networking: the service provider perspective," Ericsson Review, pp. 2-7, Telefonaktiebolaget LM Ericsson, Stockholm, Sweden (Feb. 21, 2013).

John et al., "Research Directions in Network Service Chaining," IEEE SDN for Future Networks and Services, pp. 1-7, Institute of Electrical and Electronics Engineers, New York, New York (Nov. 11-13, 2013).

Zhu et al., "Software Service Defined Network: Centralized Network Information Service," IEEE SDN for Future Networks and Services, pp. 1-7, Institute of Electrical and Electronics Engineers, New York, New York (Nov. 11-13, 2013).

Risso et al., "Some Controversial Opinions on Software-Defined Data Plane Services," IEEE SDN for Future Networks and Services, pp. 1-7, Institute of Electrical and Electronics Engineers, New York, New York (Nov. 11-13, 2013).

Zhang et al.,"StEERING: A Software-Defined Networking for Inline Service Chaining," IEEE International Conference on Network Protocols (ICNP), pp. 1-10, Institute of Electrical and Electronics Engineers, New York, New York (Oct. 7-10, 2013).

Jiang et al., "An Architecture of Service Chaining," Internet Working Group, Internet Draft, IETF Trust, Reston, Virginia (Jun. 27, 2013).

Julong et al., "Software-defined network architecture research and practice," ZTE Technology , (Aug. 17, 2018).

* cited by examiner

METHOD AND CONTROLLER FOR CHAINING APPLICATIONS IN A SOFTWARE DEFINED NETWORK

CROSS-REFERENCE TO RELATED APPLICATIONS

This application is a continuation of International Patent Application No. PCT/EP2014/055571, filed on Mar. 20, 2014, which claims priority to International Patent Application No. PCT/EP2013/075800, filed on Dec. 6, 2013, both of which are hereby incorporated by reference in their entireties.

TECHNICAL FIELD

The present disclosure relates to a method for chaining applications in a software defined network (SDN), and further relates to a corresponding SDN controller and a system. In particular, the present disclosure provides service awareness, a service chaining infrastructure, and a service information sharing infrastructure to a SDN controller.

BACKGROUND

In modern service-oriented networks, and in particular in cloud and SDN environments, there is a need to provide complex service offerings, which are composed of chained service elements, e.g. chained SDN applications. SDN applications may be applications such as firewalls (FW), wide area network (WAN) optimization controllers (WOC), deep packet inspection (DPI), network address translation (NAT), application delivery controllers (ADC) or the like. For example, network traffic can first go through a stateful firewall, in order to ensure security, and can then go through an ADC, in order to distribute the load across multiple servers. In the physical networking world such a service chain is typically configured manually.

In the SDN approach such a service chain is configured and administered all in software, which can adapt as the services, for instance the SDN applications. The state of the art provides to this end so-called naïve chaining of virtual applications in cloud virtualizations and SDN applications in a SDN. Naïve chaining means that a plurality of applications is chained together without, for example, the SDN controller being aware of the SDN applications and/or the type of SDN applications it chains. Naïve chaining is today pursued by many companies, although it has several disadvantages and problems.

For example, the order of the plurality of applications chained in the naïve service chain may have implications on the overall behavior of the service chain. In other words, the order, by which different applications are chained together in the service chain, may severely influence the outcome of the service chain. Moreover, different applications in a naïve service chain may interfere with each other, and thereby reduce the performance or even prohibit certain processes. For example, encryption (crypto) prohibits DPI. Or NAT before a firewall prevents a stateful inspection. Another problem of naïve service chaining is that many applications duplicate and repeat specific core functions. For example, DPI is repeated by many applications. Due to the repetition, precious computation resources are wasted.

SUMMARY

In view of the above disadvantages and problems, the present disclosure aims to improve the state of the art. In particular, the object of the present disclosure is to introduce service awareness and a service chaining infrastructure in the SDN controller. In other words, the object of the present disclosure is that the SDN controller is aware of the applications and application types it chains. Thereby, the present disclosure has specifically the aim that different applications in a service chain do not interfere with each other. The present disclosure also intends to reduce the necessary computation resources, specifically by employing synergistic effects of different applications in a service chain. The present disclosure also desires to make it easier for third party application developers to create new and unique applications without the need to consider interactions with other existing applications. In general, the present disclosure has the overall goal to provide an efficient and optimized application chaining (service chaining), while utilizing the ability of SDN to run network services as applications over an SDN controller.

The above-mentioned object of the present disclosure is achieved by the solution provided in the enclosed independent claims. Advantageous implementations of the present disclosure are further defined in the respective dependent claims. In particular, according to the claimed method and claimed SDN controller, an awareness of the applications in a service chain is provided to the SDN controller, and the service chaining can as a consequence be made more efficient.

A first aspect of the present disclosure provides a method for chaining applications in a software defined network (SDN), the method comprising creating a service data table in an SDN controller, wherein in the service data table a plurality of applications is associated with a plurality of application types, creating at least one service chain defining an order of application types in an SDN controller, and registering at least one application to the at least one service chain based on the application type associated with the at least application in the service data table.

A service chain is a routing context that defines a scheme for routing a flow comprising at least one data packet between applications in a predefined order. The routing scheme will cause the at least one data packet to go to and from the applications linked by the service chain. The routing scheme is stored in a database of the SDN controller. If more than one service chain is created in the SDN controller, these service chains are called different service chain instances, are all stored in the database, and may be managed in the SDN controller. Each service chain instance may be an instantiation of a routing scheme with a different set of applications and/or a different predefined routing order. That means, for each service chain instance, the database may include information about the applications and/or application types which are to be chained, and the order in which the applications and/or application types are to be chained.

Any service chain instance is a set of forwarding instructions, which are programmed by the SDN controller to the relevant forwarding entities. For example, if a plurality of applications is running on the SDN controller, a service chain instance may be the way the inter process communication (IPC) is configured to deliver the packets between the plurality of applications. Applications in a service chain are themselves only aware of their location in the routing scheme, but are not necessarily aware of the actual routing of the at least one data packet and/or of the actual locations of other applications in the service chain.

In general, the above-described method of the present disclosure implements service awareness into the SDN controller. That means that by performing the method of the present disclosure, the SDN controller becomes aware of the applications it chains. The method of the present disclosure enables a more efficient and optimized service chaining, i.e. chaining of applications, while the ability of an SDN to run network services as applications over the SDN controller is fully utilized.

In particular, when a flow comprising at least one data packet is routed by the SDN controller through the one or more applications contained in a service chain, the routing is carried out according to the order of applications as stored in the SDN controller in respect to said service chain (or service chain instance). The order of the applications, i.e. in particular the order of application types, ensures that applications of different types do not interfere with each other. Furthermore, the order of the applications according to the service chain also ensures that applications of different types can synergize with each other. For example, an application of the DPI type can be provided at the beginning of the service chain, so that the succeeding applications in the service chain may use the information obtained by the DPI application. The same could be done for an application of the crypto type. As a consequence, individual applications can be programmed more lean and simple, since they can leverage the synergy of having, for example, DPI or crypto done at a separate place in the service chain. This makes it easier for application developers to develop new applications or new services for the SDN environment.

In the method of the present disclosure, the at least one service chain is the essential mechanism for coordinating between the various types of applications. By associating each service application with a predefined application type, and by using the service data table for storing said association of applications and application types, an easy integration of an application of one type with other applications of other types is enabled. In particular, unwanted interferences between different application types are eliminated. Thereby, for instance, a mix and match of best of breed SDN applications from different vendors is enabled. Moreover, the developers of new applications are freed from integration considerations with other applications, since in the method of the present disclosure all integration is done by the SDN controller.

The at least one service chain preferably supports both a sequential operation of the service chain (i.e. one application after the other operates on a flow), or a concurrent operation of the service chain (i.e. multiple applications operate on a flow in parallel).

In a first implementation form of the method according to the first aspect, the method further comprises exposing the at least one service chain and the service data table to applications through at least one application programming interface, API.

The at least one API enables the at least one application to register to the at least one service chain in a simple manner and according to its application type. The API provides a standardized interface for developers of new applications. The at least one application is furthermore enabled to access the internal data flow and the service data table via the at least one API. For example, applications may be enabled to selectively access specific entries of fields within the service data table through an API.

By using common APIs and data structures at the SDN controller, third party application developers may create their own unique applications without needing to consider interactions with other applications. Through the at least one API, different applications can also be aware of each other, can thus avoid interferences between each other, and can even use synergies.

In a second implementation form of the method according to the first aspect as such or according to the first implementation form of the first aspect, the method comprises creating in the at least one service chain a plurality of service insertion points for applications, wherein each service insertion point accepts (only) applications of one or several application types associated to the service insertion point.

Service insertion points are locations (points) in the routing scheme of the at least one service chain, where specific types of applications (as defined by the service data table) may register and reside, i.e. where specific types of applications may be inserted. For different service chain instances, applications may adhere to different points of the routing scheme. Each service insertion point has a unique role in the at least one service chain, and preferably (only) accepts a specific type or a limited number of specific types of applications. In other words, each service insertion point is selective to at least one application type. More than one application of the same type can be registered per service insertion point. However, per flow only one application of a specific type may also be used. Furthermore different service insertion points may accept different types of applications.

Since each application is associated in the service data table with a predefined application type, the SDN controller, by accessing the service data table, is able to associate each application to the relevant service insertion point. By coordinating application types between the SDN controller and applications (and application developers) the correct assignment of an application to the right service insertion point is ensured. As a consequence, by creating the service chain with the service insertion points, the method of the present disclosure provides an optimized application order, and particularly an order that is consistent for all flows that are routed through the service chain. The order of the service insertion points helps optimizing the overall service delivery and the performance of the service chaining.

In a third implementation form of the method according to the second implementation form of the first aspect, each service insertion point is exposed to applications through at least one API.

Thereby, the at least one application is enabled to register to a specific service insertion point according to its application type. Applications of different type can register to different service insertion points. However, a service insertion point may also support various application types.

In a fourth implementation form of the method according to the first aspect as such or according to any of the previous implementation forms of the first aspect, the registering step comprises determining, by the SDN controller, the application type of the at least one application according to the service data table, and associating, by the SDN controller, the at least one application with at least one service insertion point according to the determined application type.

The SDN controller can thereby manage and optimize the order of the applications in the service chain. The SDN controller is aware of the different application types, and can order the applications according to their types so as to avoid interferences, and preferably even use synergies, between applications. Thus, an efficient an optimized service chaining is enabled by the method of the present disclosure.

In a fifth implementation form of the method according to the fourth implementation form of the first aspect, the registering step comprises creating, by the SDN controller, a new application type in the service data table, if the at least one application is determined not to be associated with an application type in the service data table, and associating, by the SDN controller, the at least one application with at least one service insertion point according to the created application type.

As a consequence, application developers do not need to worry about integrating a newly developed application into a service chain, and do not need to take into account interactions of their application with other applications. In the method of the present disclosure the SDN controller takes care of integrating the application into the at least one service chain.

In a sixth implementation form of the method according to any of the second to fifth implementation forms of the first aspect, data traffic between the service insertion points is transmitted by a service chain dispatcher.

In a seventh implementation form of the method according to the first aspect as such or according to any of the previous implementation forms of the first aspect, the method further comprises routing, by the SDN controller, at least one flow comprising at least one data packet according to the at least one service chain of applications.

Not all applications in the at least one service chain need to be used per flow. Thus, the service chain is flexible and adaptable per flow. It is also possible to steer only a part of a flow, which is needed by a specific application, to said application.

In an eighth implementation form of the method according to the seventh implementation form of the first aspect, the method further comprises extracting, by the at least one application, metadata from the flow, and storing the extracted metadata as information about the flow in a flow table.

In the flow table centralized flow information and metadata information may be maintained for different applications to share amongst each other. In other words, the flow table enables a sharing of information with regards to the flows between different applications, and particularly applications of different types. Applications may access the flow, in order to obtain the flow information. As will be described in more detail below, the flow table can be created in the SDN controller itself, can be created in an external chaining module accessible by the SDN controller, or can be distributed between the at least one application.

For example, an application of the DPI type may extract information about "micro-flows" from a main flow, which is routed through the service chain. The application may then populate the service data table with the extracted micro-flow information. Other applications may access the service data table, and may use said micro-flow information. Thus, applications are enabled to synergistically exchange information.

Additionally, information about flow changes may be stored by an application within the service data table for further use by other applications. For example, an application of the NAT, type may change the source IP of a flow, and may register this change in a dedicated entry or field in the service data table. Applications succeeding the NAT application in the service chain may learn of and use the changed source IP.

In a ninth implementation form of the method according to the eighth implementation form of the first aspect, the metadata extracted from the flow comprises an application type, a specific application ID, a user ID and/or a flow content ID.

In a tenth implementation form of the method according to the eighth or ninth implementation form of the first aspect, the metadata extracted from the flow comprises frame information about each frame of the flow.

In an eleventh implementation form of the method according to the tenth implementation form of the first aspect, the frame information comprises a frame marked for dropping, a changed header and/or previous header information.

In a twelfth implementation form of the method according to the eighth to eleventh implementation form of the first aspect, a plurality of applications share the metadata stored in the flow table.

In a thirteenth implementation form of the method according to the eighth to twelfth implementation forms of the first aspect, the flow table is created in the SDN controller.

In other words, the flow table is internal to the SDN controller. Due to the internal flow table, both the service chaining infrastructure and a service information sharing infrastructure are located in the SDN controller. Thus, the chained applications are provided by the SDN controller with the possibility to share information amongst each other, for instance, information about network data traffic, i.e. about a flow through the service chain. Therefore, the SDN controller is able to achieve alone several advantages of the present disclosure. Furthermore, the least amounts of devices are necessary in this implementation, and the fastest service chaining may be achieved.

In a fourteenth implementation form of the method according to the thirteenth implementation form of the first aspect, the at least one flow is routed through the SDN controller according to the at least one service chain of applications.

In a fifteenth implementation form of the method according to any of the eighth to twelfth implementation forms of the first aspect, the flow table is created in a chaining module connected to the SDN controller.

In other words, the flow table is provided external to the SDN controller. The chaining module is preferably exposed to the SDN controller and the applications through at least one API.

In a sixteenth implementation form of the method according to the fifteenth implementation form of the first aspect, the method further comprises creating, by the SDN controller, network paths between the at least one application and the chaining module according to the order of application types defined by the service chain.

In a seventeenth implementation form of the method according to the sixteenth implementation form of the first aspect, the at least one flow is routed through the chaining module and the network paths created by the SDN controller according to the at least one service chain of applications.

Due to the external flow table in the chaining module, the service information sharing infrastructure is located outside of the SDN controller. Thereby, the load on the SDN controller can be reduced.

In an eighteenth implementation form of the method according to any of the eighth to twelfth implementation forms of the first aspect, the flow table is distributed over the at least one application and a further application registered to the service chain.

In other words, the flow table is external to the SDN controller. The SDN controller may access the flow table via the (chain) APIs of the SDN controller and at least one application, respectively.

In a nineteenth implementation form of the method according to the eighteenth implementation form of the first aspect, the at least one flow comprising at least one data packet is routed through the at least one application and the further application according to the at least one service chain of applications by using a message passing mechanism.

Due to the external flow table in the applications, the service information sharing infrastructure is located outside of the SDN controller. Thereby, load is taken from the SDN controller, and may be distributed among the applications. The message passing mechanism may be provided in the SDN controller or an external module. The shortest routing paths may be achieved. Again any service chain instance is a set of forwarding instructions programmed by the SDN controller to the relevant forwarding entities. In this implementation form, in which the applications are running external to the SDN controller and a distributed flow table is used, a service chain instance may be realized by forwarding entries configured on (virtual) switches, of the hosts on which the applications are installed.

In a twentieth implementation form of the method according to any of the eighth to nineteenth implementation forms of the first aspect, the method further comprises querying, by the at least one application, the flow table, in order to obtain the stored information about the flow.

By querying the flow table, each application can obtain the stored flow and/or frame information. Thereby, synergies between applications can be used, and as a consequence the total processing load and the processing load per application is reduced.

In a twenty-first implementation form of the method according to the first aspect as such or according to any of the previous implementation forms of the first aspect, the service chain creating step comprises, creating, by the SDN controller, a plurality of service chains, and customizing, by the SDN controller, each service chain for a different customer.

The plurality of service chains are different service chain instances, wherein each service chain instance may be used for a different customer. Thus, the method of the present disclosure provides service chaining with increased flexibility.

In a twenty-second implementation form of the method according to any of the eighth to twenty-first implementation forms of the first aspect, the method further comprises associating, by the SDN controller, a plurality of flows to the at least one service chain using user defined filtering.

By employing user defined filtering, the at least one service chain created by the SDN controller can be customized easily and quickly. In particular, a single service chain may be dynamically customized for different users (customers), thus providing increased flexibility.

A second aspect of the present disclosure provides a software defined network, SDN, controller, for chaining applications in a SDN, wherein a service data table is installed in the SDN controller, wherein in the service data table a plurality of applications are associated with a plurality of application types, at least one service chain defining an order of application types is implemented on the SDN controller, and the SDN controller is configured to register at least one application to the service chain based on the application type associated with the application in the service data table.

The SDN controller of the second aspect can be further configured to carry out steps and actions according to the various implementations of the method of the first aspect described above.

In a first implementation form of the software defined network controller according to the second aspect, the SDN controller is configured to create in the at least one service chain a plurality of service insertion points for applications, wherein each service insertion point accepts only applications of one or several application types associated to the service insertion point.

In a second implementation form of the software defined network controller according to the second aspect as such or the first implementation form of the second aspect, the SDN controller is configured to determine the application type of the at least one application according to the service data table and the SDN controller is configured to associate the at least one application with at least one service insertion point according to the determined application type.

In a third implementation form of the software defined network controller according to the second implementation form of the second aspect, the SDN controller is configured to create a new application type in the service data table, if the at least one application is determined not to be associated with an application type in the service data table and the SDN controller is configured to associated the at least one application with at least one service insertion point according to the created application type.

In a fourth implementation form of the software defined network controller according to the second aspect as such or any one of the previous implementation forms of the second aspect, the SDN controller is configured to route at least one flow comprising at least one data packet according to the at least one service chain of applications, and a flow table is installed in the SDN controller, wherein in the flow table metadata extracted by the applications from the flow is stored as information about the flow.

A third aspect of the present disclosure provides a system comprising an SDN controller according to the second aspect as such or any of the first to third implementation forms of the second aspect and at least one application, wherein the SDN controller is configured to route at least one flow comprising at least one data packet according to the at least one service chain of applications, and the at least one application is configured to extract metadata from the flow, and to store the extracted metadata in a flow table as information about the flow.

According to a first implementation form of the system according to the third aspect as such, the flow table is created in the SDN controller, or the flow table is distributed over the at least one application and a further application registered to the service chain, or the system further comprises a chaining module connected to the SDN controller and the flow table is created in the chaining module.

Thereby, with the system of the third aspect, the respective advantages mentioned above for the method of the first aspect may be obtained.

A fourth aspect of the present disclosure provides a computer program having a program code for performing the method according to any of the implementation forms of the first aspect or the first aspect as such, when the computer program runs on a computer.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of the present disclosure will be explained in the following description of specific embodiments in relation to the enclosed drawings.

DETAILED DESCRIPTION OF EMBODIMENTS

Figure 1:
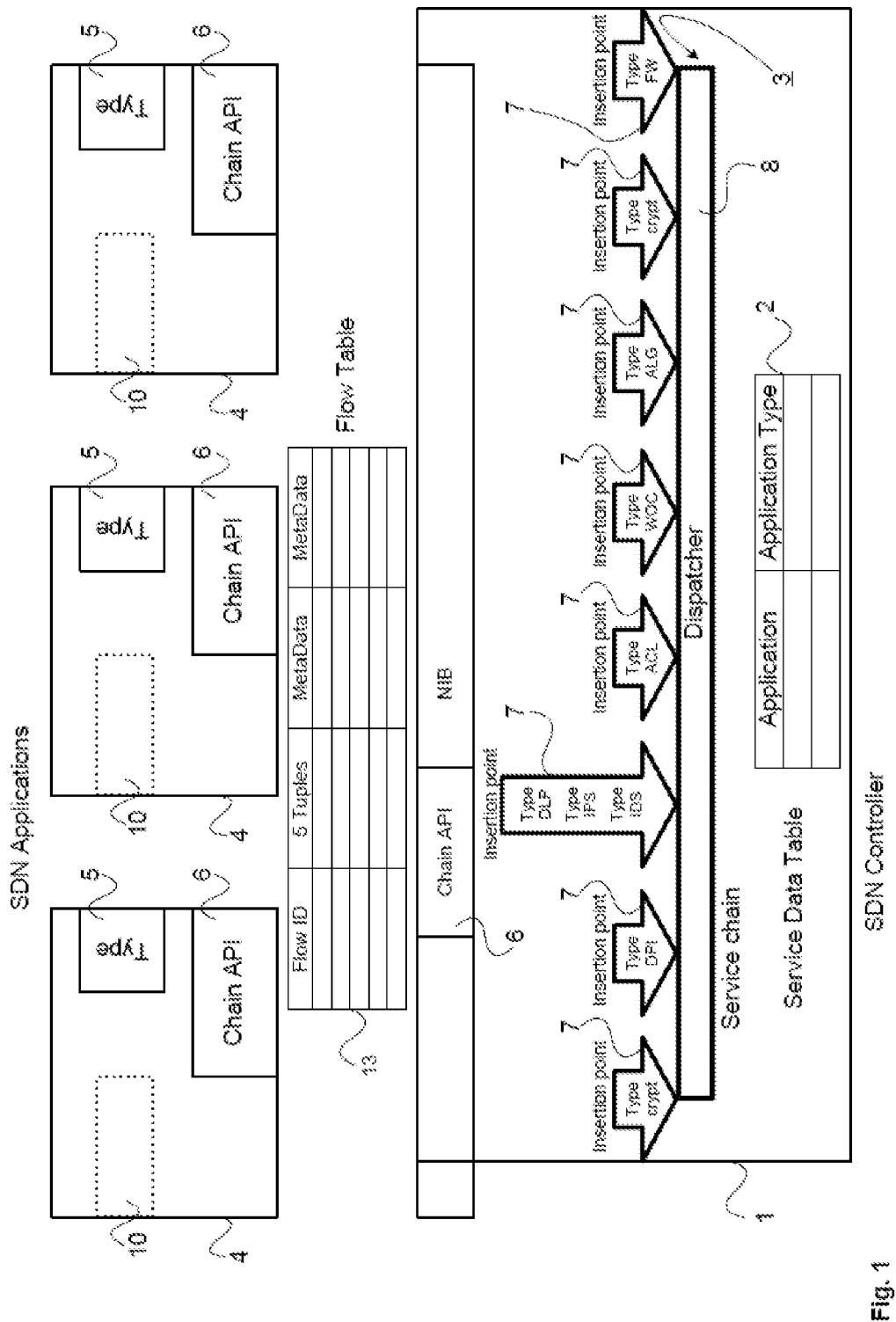
FIG. 1 shows a SDN controller, a flow table, and multiple SDN applications, which are registered according to an embodiment of the present disclosure to a service chain in the SDN controller.

FIG. 1 shows a SDN environment including an SDN controller 1 according to an embodiment of the present disclosure, a flow table 13, and a plurality of SDN applications 4. The SDN controller 1 is configured to be aware of the services provided in the SDN network, i.e. to be aware of the plurality of SDN applications 4. Each SDN application 4 may be identified by a specific application type 5.

Figure 4:
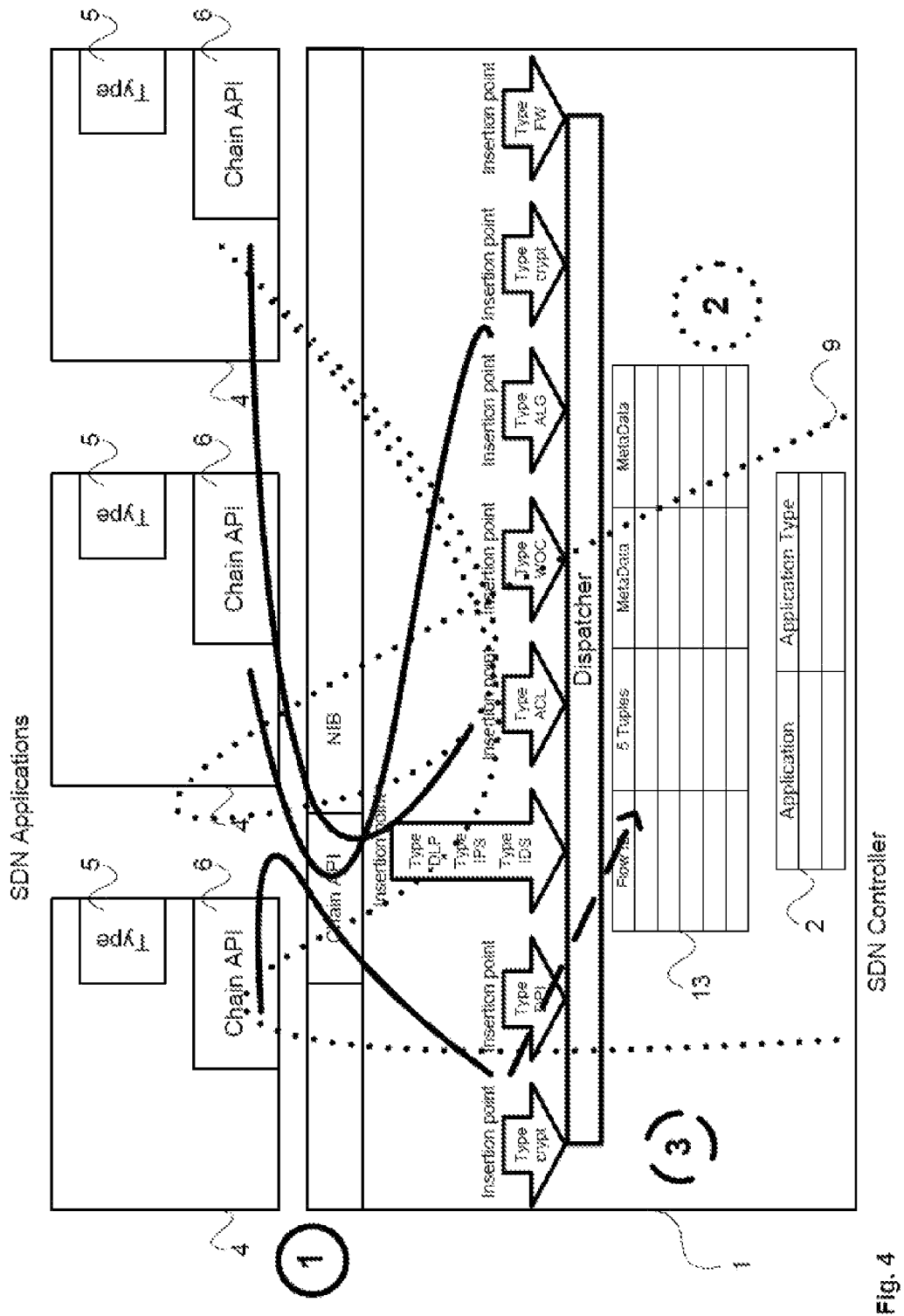
FIG. 4 shows schematically a flow, which it is routed through a SDN controller according to an embodiment of the present disclosure.

According to embodiments of the present disclosure, at least one service chain 3 is created and implemented in the SDN controller 1. The service chain 3 defines an order of SDN applications 4 in dependence of their application types 5. The SDN controller 1 can route network traffic, i.e. at least on flow 9 (as shown in FIG. 4) containing at least one data packet through the service chain 3, i.e. according to the order of the SDN applications 4 in the service chain 3. The SDN applications 4 of the service chain 3 then operate on the flow 9 according to their order. Thereby, the SDN applications 4 can operate on the flow one after the other and/or in parallel. The service chain 3 is a routing scheme. The information about the routing scheme is stored in a database or in a memory of the SDN controller 1. Different service chain 3 instances may be created and stored in the database or memory. For each service chain 3 (or service chain instance) a set of forwarding instructions is programmed by the SDN controller 1 to the relevant forwarding instances. For example, in case SDN applications 4 are run on the SDN controller 1, a service chain 3 may be realized by configuring the IPC to deliver data packets or frames of a flow from one application to the other. In case SDN applications 4 are run external to the SDN controller, a service chain 3 may be realized by configuring (virtual) switches, of the hosts on which the application are installed, to deliver data packets or frames of a flow from one application to the other.

Further, according to embodiments of the present disclosure a service data table 2 is created in the SDN controller 1, and is made accessible to the SDN applications 4.

The service data table 2 includes at least an association of each of the plurality of SDN applications 4 with predefined application types 5. In FIG. 1 three different SDN applications 4, i.e. SDN applications 4 of three different application types 5, are registered to one service chain 3 in the SDN controller 1. Each SDN application 4 is registered to the service chain 3 in the SDN controller 1 by at least one application programming interface, API, 6. The at least one API 6 exposes the service chain 3 to the SDN applications 4. The service data table 2 may also be accessed by the SDN applications 4 via at least one API 6. The order of the SDN applications 4 chained in the service chain 3 is based on their application types 5, which are stored in the service data table 2.

The service data table 2 is an important aspect of embodiments of the present disclosure. As mentioned above, in the service data table 2 at least a plurality of SDN applications 4 is associated with a plurality of application types 5. That means that each service (e.g. application) that is run on the SDN controller 1 is associated with one of a plurality of predetermined application types 5, and therefore—through its connection to the service data table—the SDN controller 1 is always aware of each application type 5 that is run on it. In this way, the SDN controller 1 is also able to run different applications 4 in a specific optimized order, particularly optimized according to the application type 5. The SDN controller 1 creates the at least one service chain 3 by taking into account the application types 5. When establishing the order, the SDN controller 1 takes into account possible interferences of different applications 4 and application types 5 or seeks to exploit synergistic effects between different applications 4 and application types 5 through the order.

Further, according to embodiments of the present disclosure a flow table 13 is provided, and is made accessible to the SDN applications 4 and the SDN controller 1. The flow table 13 may be created in the SDN controller 1 itself (see FIG. 4), may be provided in an external chaining module 11 (see FIG. 5), or can be distributed over one or more SDN applications 4 (see FIG. 6). Details of these various use cases of the flow table 13 are described below. The SDN applications 4 may use the flow table 13 when a flow comprising at least one packet is routed according to the at least one service chain 3. The SDN applications 4 are each aware of their locations in the service chain 3, but are not necessarily aware of the actual routing order of the at least one data packet according to the service chain 3 order, or of the actual locations of the other SDN applications 4 in the service chain 3. By using the flow table 13, a predefined routing of a flow 9 through the SDN applications 4 according to the order of a service chain 3 can nevertheless be efficiently maintained, without routing the flow through the SDN controller 1.

In the flow table 13, flow information, for example, a flow ID, the type of the flow, or the so called 5 tuple (comprising source IP address, destination IP address, source port number, destination port number and the protocol in use) can be stored, as shown in FIG. 1. Furthermore, metadata information can be stored in the flow table 13, for instance, a type length value (TLV). The metadata may also comprise an application type (e.g. Video, P2P, etc.), a specific application ID (e.g. WeBex Video, Bittorrent), a user ID and/or a flow content ID (e.g. file types, encrypted/non-encrypted content, etc). The metadata may also comprise frame information about each frame of the flow 9, for instance information concerning a frame marked for dropping, a changed header (optionally with previous header information) and/or previous header information.

The flow table 13 enables sharing of the information between different applications 4, which can individually access the flow table 13 via their respective API 6. For example, each application 4 can access and query the flow table 13, in order to obtain the information stored therein, or it can store information extracted from a flow 9 into the flow table 13.

Figure 2:
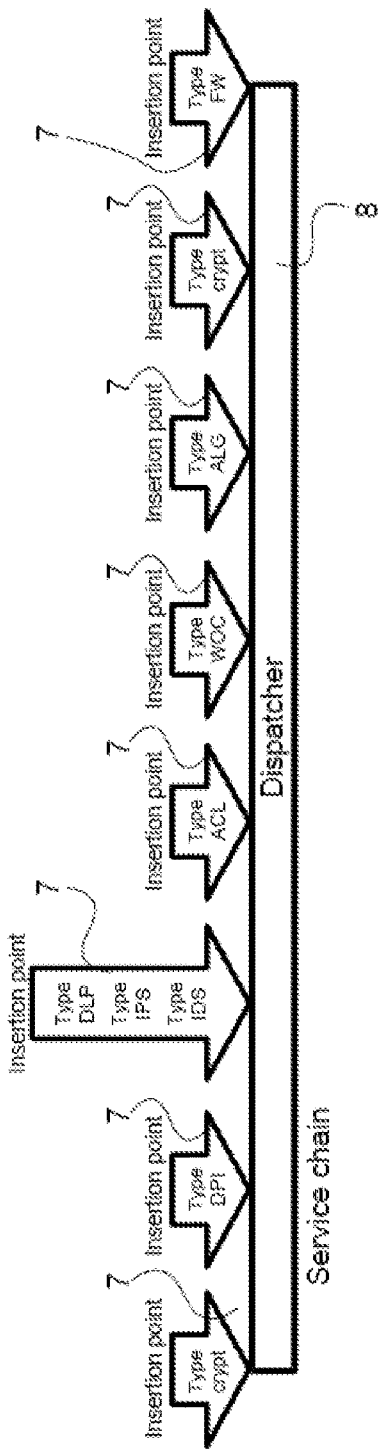
FIG. 2 shows a service chain as implemented in the SDN controller according to an embodiment of the present disclosure.

FIG. 2 shows in more detail an example of a service chain 3 created in the SDN controller 1. The service chain 3 has a plurality of service insertion points 7, which are locations in the service chain 3, at which specific application types 5 may be registered. The service insertion points 7 are exposed to the applications 4 through at least one API 6. Each service insertion point 7 is preferably configured to accept only a specific application type 5. However, it may also be of advantage that one or more service insertion points 7 accept more than one but not all application types 5. For example, in FIG. 2 the third service insertion point 7 (from left to right) accepts three different application types (namely applications 4 of the data loss prevention (DLP) type, the intrusion prevention system (IPS) type, and the intrusion detection system (IDS) type. Prior to this third service insertion point 7, a first service insertion point 7 accepts only applications of the crypto type, and a second service insertion point 7 accepts only applications of the DPI type. The service insertion points 7 following the third service insertion point 7 accept applications 4 of, for example, the access control list (ACL) type, the WAN optimization controller (WOC) type, the application layer gateway (ALG) type, or of the firewall (FW) type, respectively. However, more than one application 4 of the same application type 5 can be registered per insertion point 7, but typically per each flow only one application of a specific application type 5 may be used. Furthermore, not all applications 4 (and insertion points 7) need to be used per flow, so the chain is flexible and adaptable per flow.

The service chain 3 provides an order to the different application types 5. Data traffic from the applications 4 to the service chain 3 is carried out via the application type dependent service insertion points 7. Traffic between the individual service insertion points 7 is carried out via a dispatcher 8, which can be a data bus or the like.

Since the SDN controller 1 is aware of the different application types 5 it chains, and since it has all information available in the service data table 2, particularly information on which applications 4 is associated with which application type 5, the SDN controller can order the applications 4 in the service chain 3 depending on their application types 5. By ordering the applications 4 in this way, the SDN controller 1 can ensure that the individual applications in the service chain 3 do not interfere with each other. Moreover, the SDN controller 1 can order the applications 4 in a way that the different application types 5 interact synergistically with each other.

For example, the SDN controller 1 may provide an application of the DPI type at the beginning of the service chain 3. The DPI application can populate the service data table 2 accordingly, after it has operated on a flow, and the information can be used by all other applications 4 succeeding the DPI application in the service chain 3. The service chain 3 in the SDN controller 1 can be configured such that it allows sequential operations of applications 4 in the service chain 4, i.e. it can route a flow of data packets through one application 4 after the other, or can carry out concurrent operations of applications in the service chain 3. For example, in FIG. 2 applications of the IPS, IDS and DLP type are run in parallel at the third service insertion point 7. It is also noted that per flow of data traffic not all applications 4, which are registered to a service chain 3, have to be used. In particular, several applications 4 of a service chain 3 may be omitted. For instance, applications 4 can selectively be made unavailable or available, or may be bypassed. Thereby, the service chain 3 is flexibly adaptable by the SDN controller 1, for instance, for different network users.

Figure 3:
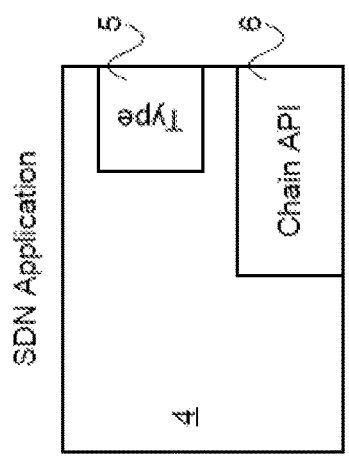
FIG. 3 shows an SDN application according to an embodiment of the present disclosure.

FIG. 3 shows an SDN application 4, which is provided with an indication of its application type 5 and at least one (chain) API 6. In order for the SDN application 4 to leverage the service chain 3, the SDN controller 1 exposes the service chain 3 using chain API 6 as shown in FIG. 1, which couple to the chain API 6 in the SDN application 4. The chain API 6 enables the SDN application 4 registering to a specific service insertion point 7 according to its application type 5. The chain API 6 also enables the applications 4 to access the service data table 2. Via the chain API 6, the SDN controller 1 is furthermore capable of coordinating the application type 5 with applications types 5 of other applications 4, and particularly to assign the application type 5 to the correct service insertion point 7 in the service chain 3.

FIG. 4 shows a first use case of the service chain 3 and the flow table 13, respectively. In the first use case, the flow table 13 is created in the SDN controller 1. In the first use case, at first, applications 4 use their chain API 6 to register to the SDN controller 1 (solid lines). The SDN controller 1 then determines the type of the applications 4 that register, and associates the application types 5 with service insertion points 7 in the service chain 3. For each new service chain instance, i.e. each new application 4 that registers to the SDN controller 1, the SDN controller 1 creates an entry in its internal flow table 13. Data traffic 9, e.g. a flow 9 comprising different frames or packets arriving, for example, from a south bound interface (SBI) is then routed through the applications 4 and through the SDN controller 1 by using the service chain 3 and the dispatcher 8 (dotted line). In the first use case a service chain instance may, for example, be realized by configuring the IPC with a predefined order for delivering data packets or frames between the chained applications 4. Applications 4, for example, a DPI type application, may populate the flow and accordingly the flow table 13 with information about the flow 9. For example, the DPI type application can extract information about micro-flows within a main flow, and can populate the flow table 13 accordingly. Also, changes and modifications to the flow or to micro-flows within the flow can be stored in the flow table 13 (dashed arrow).

Figure 5:
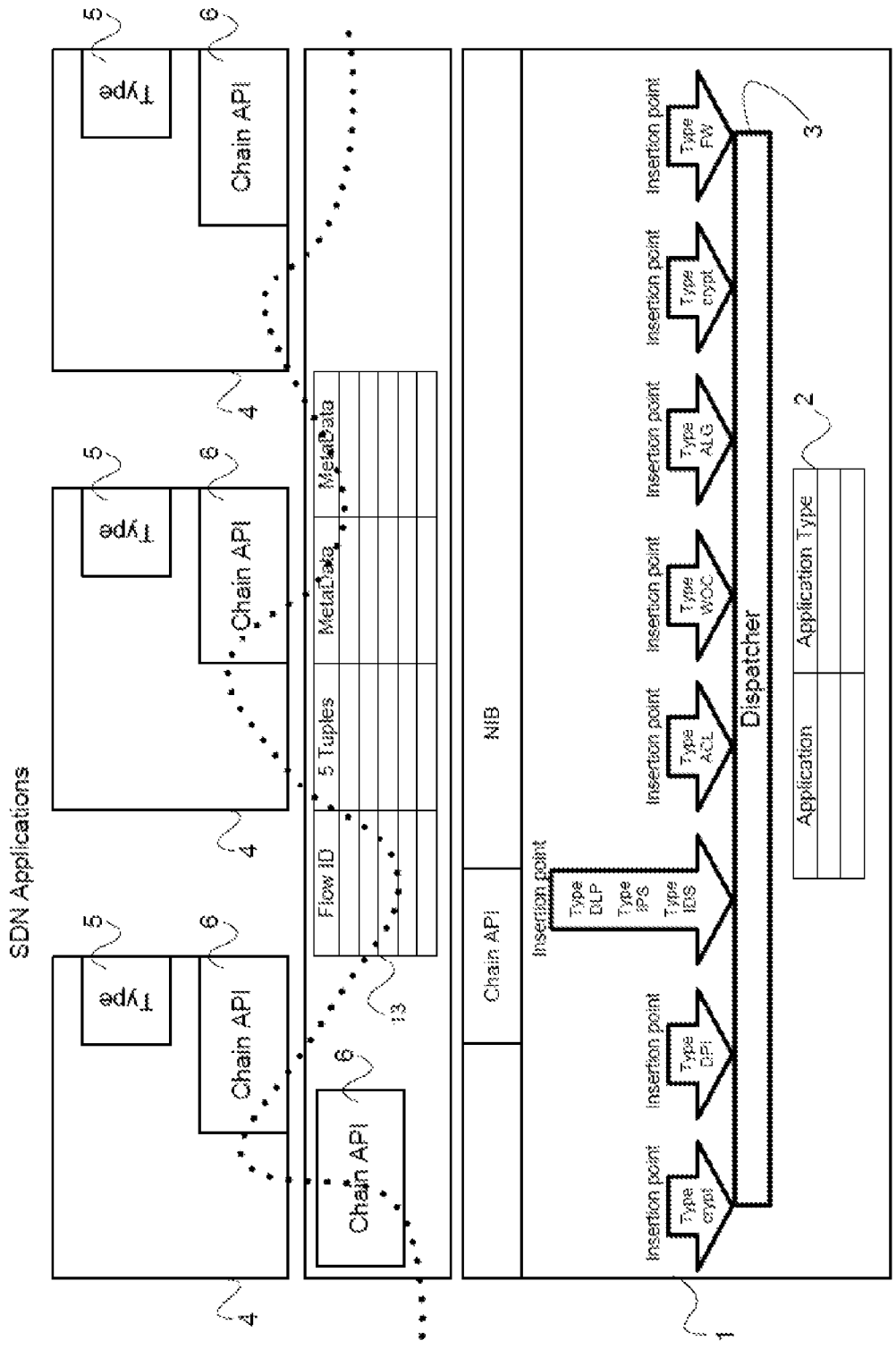
FIG. 5 shows schematically a flow, which it is routed through a chaining module according to an embodiment of the present disclosure.

FIG. 5 shows a second use case of the service chain 3 and the flow table 13, respectively. In the second use case, the flow table 13 is created in a chaining module 11, i.e. it is external to the SDN controller 1. As for the first use case, also in the second use case, at first, applications 4 use their chain API 6 to register to the SDN controller 1. The SDN controller 1 again determines the type of the applications 4 that register, and associates the application types 5 with service insertion points 7 in the service chain 3. In the second use case, for each new service chain instance, i.e. each new application 4 that registers to the SDN controller 1, the SDN controller 1 creates an entry in the flow table 13 by accessing the chaining module 11. The chaining module 11 is therefore provided with at least one API 6. The SDN controller 1 and the applications 4, respectively, may use their (chain) APIs 6, in order to access the flow table 13 in the chaining module 11.

The SDN controller 1 also creates network paths between the applications 4 and the chaining module 11. The network paths are particularly created according to the order of application types 5 defined by the service chain 3, which is installed in the SDN controller 1. Data traffic 9, e.g. a flow 9 comprising different frames or packets arriving, for example, from a south bound interface (SBI) is then routed through the applications 4 and through the chaining module 11, respectively, using the network paths created by the SDN controller 1 (dotted line). Applications 4, for example, a DPI type application, may populate the flow and accordingly the flow table 13 in the chaining module 11 with information about the flow, particularly with metadata extracted from the flow 9. For example, the DPI type application can extract information about micro-flows within a main flow, and can populate the flow table 13 in the chaining module 11 accordingly. Also, changes and modifications to the flow or to micro-flows within the flow can be stored in the flow table 13 installed in the chaining module 11. The extracted metadata may particularly comprise an application type, a specific application ID, a user ID and/or a flow content ID. The extracted metadata may also comprise frame information about each frame of the flow 9, for instance information concerning a frame marked for dropping, a changed header and/or previous header information.

Figure 6:
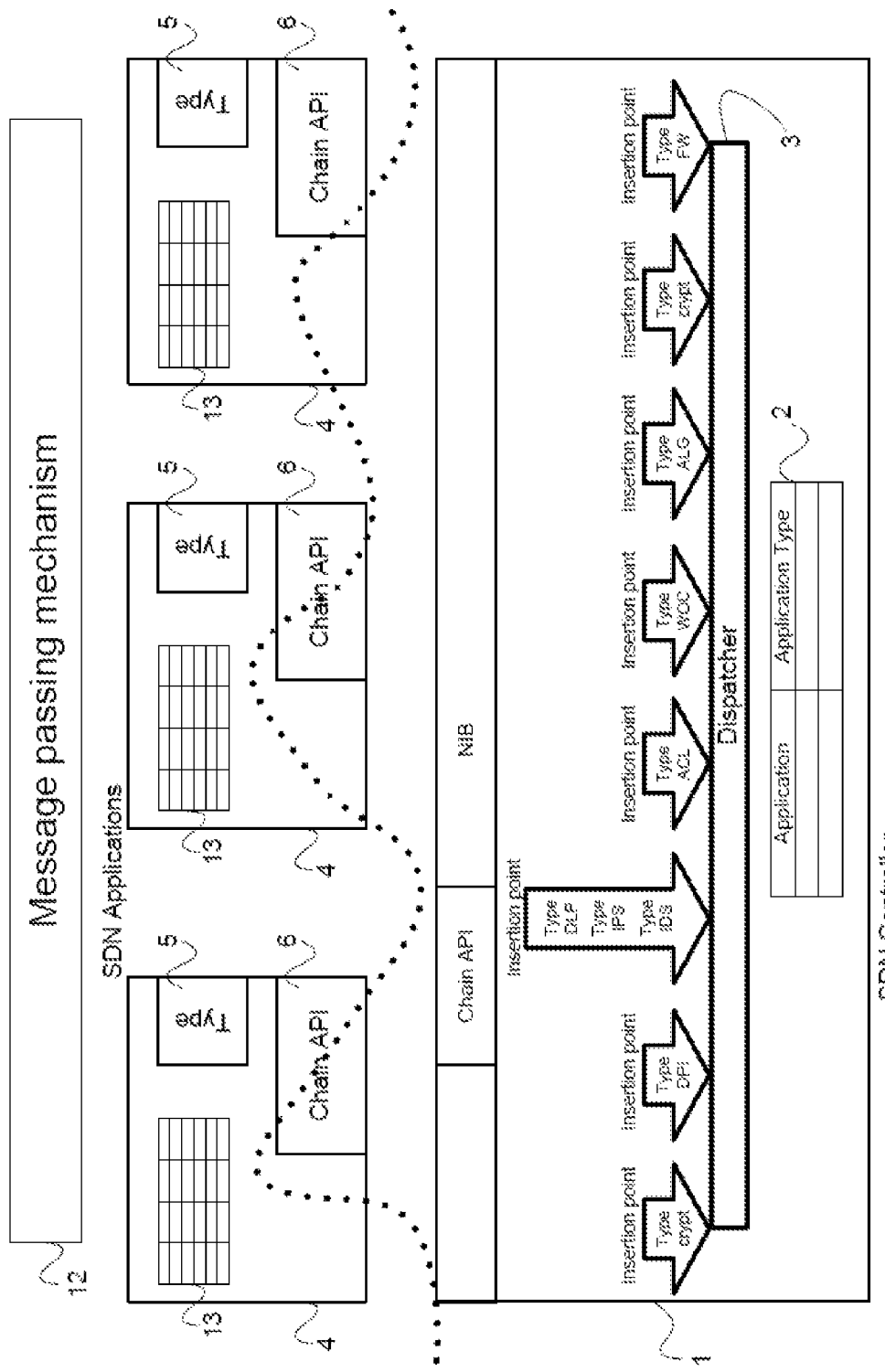
FIG. 6 shows schematically a flow, which it is routed through applications according to an embodiment of the present disclosure.

FIG. 6 shows a third use case of the service chain 3 and the flow table 13, respectively. In the third use case, the flow table 13 is distributed between the applications 4, i.e. it is external to the SDN controller 1. As in the first and second use case, in the third use case, at first, applications 4 use their chain API 6 to register to the SDN controller 1. The SDN controller 1 again determines the type of the applications 4 that register, and associates the application types 5 with service insertion points 7 in the service chain 3. In the third use case, for each new service chain instance, i.e. each new application 4 that registers to the SDN controller 1, the SDN controller 1 creates an entry in the flow table 13 distributed between the applications 4. Therefore, the SDN controller 1 uses its API to access the various applications 4 via their respective APIs 6.

Data traffic 9, e.g. a flow 9 comprising different frames or packets arriving, for example, from a south bound interface (SBI) is then routed directly through the applications 4 and according to the at least one service chain 3 of applications 4 maintained in context in the SDN controller 1 (dotted line). To this end, the applications 4 preferably use a message passing mechanism 12. The message passing mechanism 12 may also be used to exchange per flow information between the applications 4. The message passing mechanism 12 may be implemented in the SDN controller 1 or in an external module. In the second use case a service chain instance may, for example, be realized by configuring forwarding entries of (virtual) switches, of the hosts on which the applications 4 are installed, for delivering data packets or frames in a predefined order between the chained applications 4. Applications 4, for example, a DPI type application, may populate the flow and accordingly the distributed flow table 13 with information about the flow, particularly with metadata extracted from the flow 9. For example, the DPI type application can extract information about micro-flows within a main flow, and can populate the distributed flow table 13 accordingly. Also, changes and modifications to the flow or to micro-flows within the flow can be stored in the service data table 2 distributed between the applications 4. The extracted metadata may particularly comprise an application type, a specific application ID, a user ID and/or a flow content ID. The extracted metadata may also comprise frame information about each frame of the flow 9, for instance information concerning a frame marked for dropping, a changed header and/or previous header information.

Figure 7:
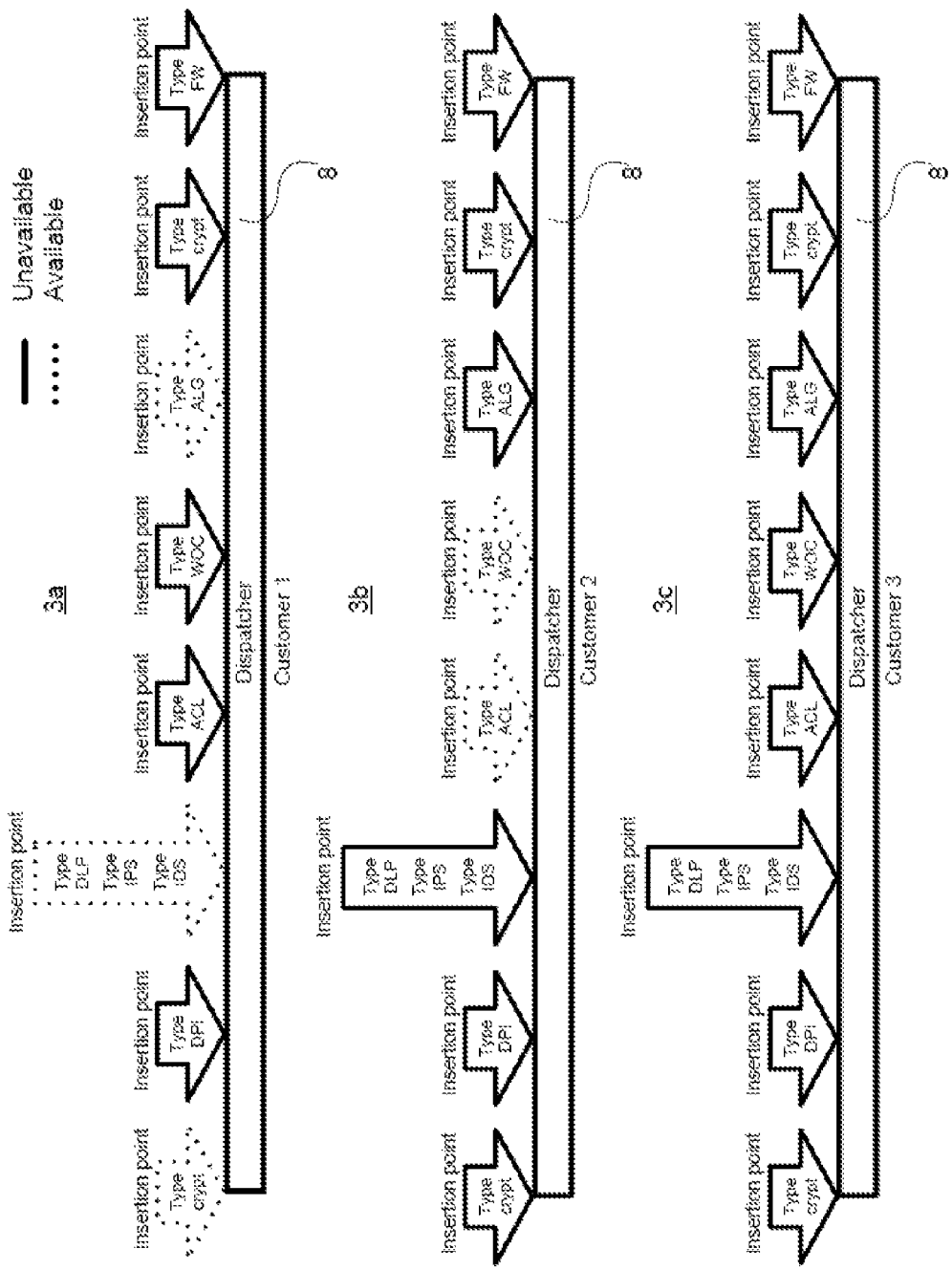
FIG. 7 shows three differently customized service chains according to an embodiment of the present disclosure.

FIG. 7 shows differently customized service chains 3*a*, 3*b*, 3*c*, i.e. different service chain instances, which can be created in the SDN controller 1. The SDN controller 1 may create more than one service chain 3 instance, for example, service chains 3*a*, 3*b*, 3*c* customized for different customers 1, 2, 3. In FIG. 7 the service chain customization is provided for customer 1, customer 2 and customer 3, respectively. In particular, not each customer may need all applications of a service chain 3. Therefore, depending on the customer, a different application order may be established in a service chain 3*a*, 3*b*, 3*c*.

Preferably, the at least one service chain 3 in the SDN controller 1 is flexible, and can be customized preferably dynamically to the preferences of the customers. To this end, the SDN controller 1 is preferably configured to selectively make specific applications 4 in the service chain 3 available or unavailable depending on the customer. For example, the SDN controller 1 may apply a user (customer) defined filter to the applications 4 in the service chain 3. In FIG. 5, it can be seen that the service chain 3*a* for customer 1 has unavailable Crypto, DLP, IPS, IDS and ALG. The service chain 3*b* for customer 2 has unavailable ACL and WOC. The service chain 3*c* for customer 3 has all applications 4 (from all application types 5) in the service chain 3 available.

The SDN controller 1 can either create a plurality of service chains 3*a*, 3*b*, and 3*c* for different customers, or can use a single service chain 3, which can be flexibly adapted by selectively filtering out applications 4 depending on the customer.

Figure 8:
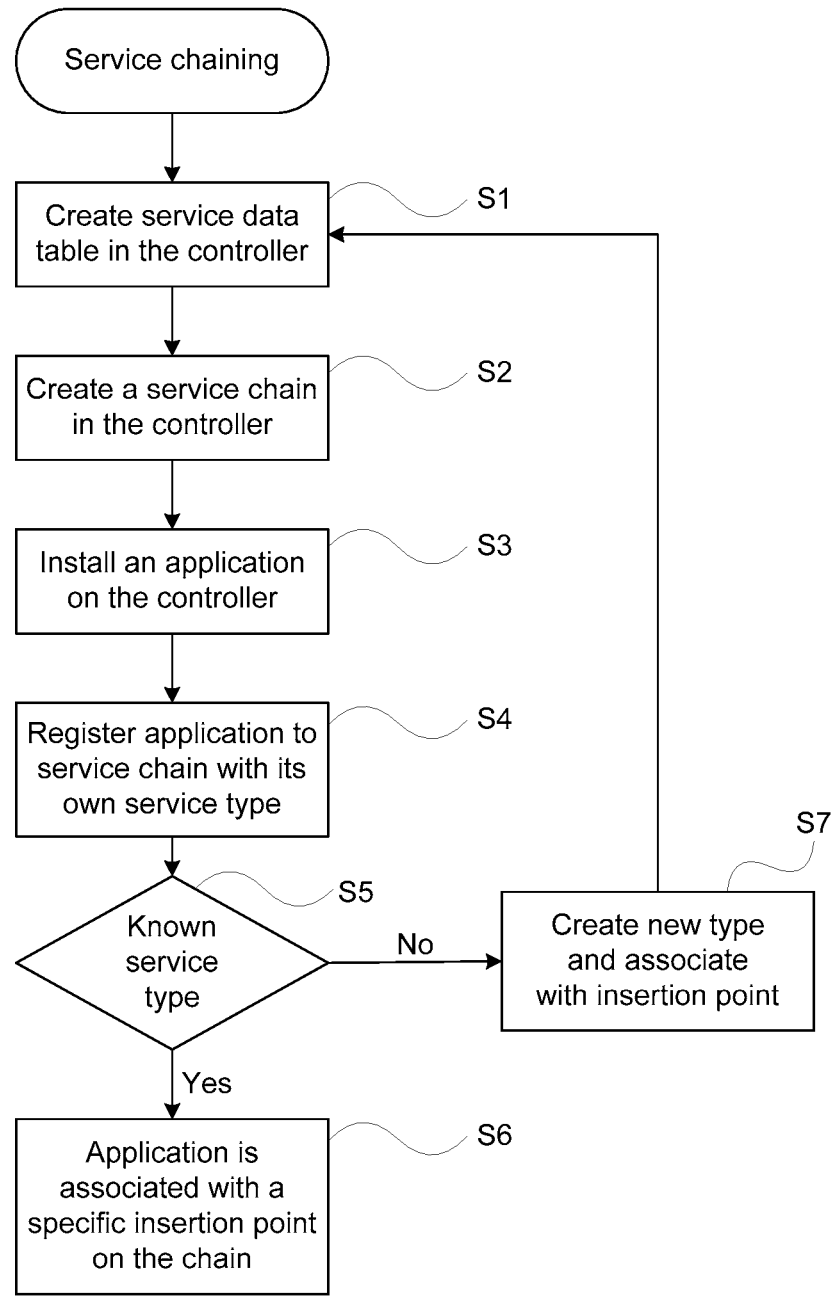
FIG. 8 shows a flow diagram illustrating the service chaining according to an embodiment of the present disclosure.

FIG. 8 shows a general flow chart illustrating service chaining according to a method for chaining applications 4 in SDN according to an embodiment of the present disclosure. In a first step S1 a service data table 2, is created in the SDN controller 1. Furthermore, a flow table 13 may be created in step S1. As described above the flow table 13 may be created in step S1 in the SDN controller 1, in an external chaining module 11, or may be distributed among a plurality of applications 4. This flow table 13 enables sharing of information between different applications 4 with regards to the flows. In an embodiment, a DPI function would extract information about "micro-flows" within a main flow, and would populate the flow table 13 accordingly. Furthermore, this flow table 13 also enables storing of information about flow changes by the application for further use. For example a NAT function may change the source IP of the flow and this would register at the MetaData/TLV fields of the flow table 13 for the succeeding Firewall to use. In a second step S2 a service chain 3 is created in the SDN controller 1. Also more than one service chain 3 may be created in this step S2. In a step S3 at least one application 4 is installed on the SDN controller 1, and in a further step S4 at least one application 4 is registered to the service chain 3 based on its application type 5. The application type 5 is associated with the application 4 in the service data table 2.

For the step S4 of registering the application 4 to the service chain 3, the SDN controller 1 determines in step S5, whether the service type, i.e. the application type 5 of the application 4 to be registered, is known, i.e. whether an application type 5 is associated with the application 4 in the service data table 2. In case the application type 5 is known, the application 4 is associated in step S6 with a specific service insertion point 7 in the service chain 3. In particular, the SDN controller 1 chooses the service insertion points 7 for the application 4 based on its application type 5. If the application type 5 is not known in step S5, the SDN controller 1 creates in step S7 a new application type, and associates the application 4 with this new application type 5 in the service data table 2. Furthermore, the SDN controller 1 associates the application type 5 with a service insertion point 7 in the service chain 3. Then the SDN controller 1 returns to step S1.

Figure 9:
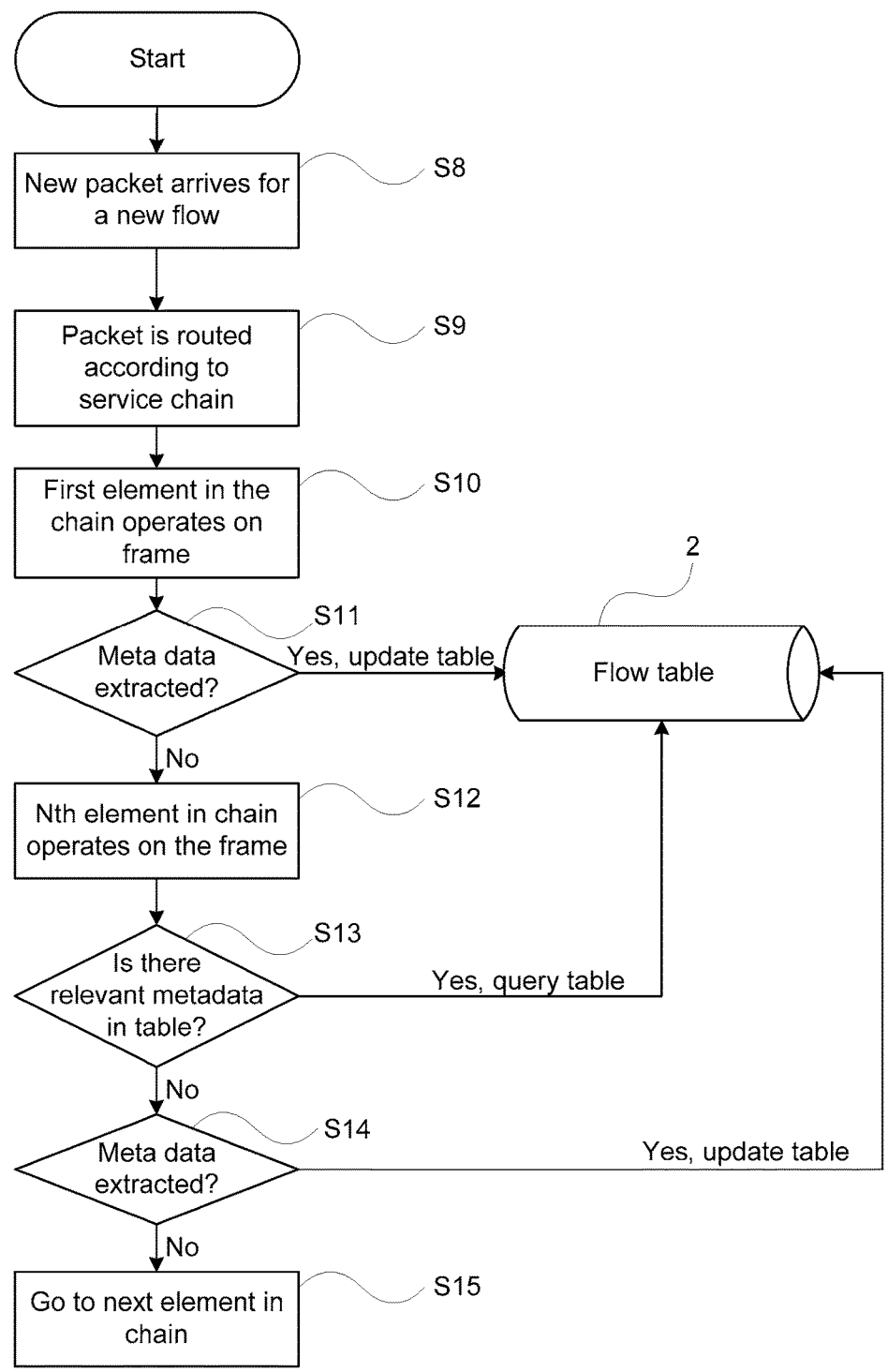
FIG. 9 shows a flow diagram illustrating a routing of a flow through the service chain according to an embodiment of the present disclosure.

FIG. 9 shows in general the routing of data traffic, i.e. of at least a flow comprising one or a plurality of data packets, through the service chain 3. In step S8 a new packet arrives for a new flow 9. In step S9 the packet is sent to the first element of the service chain 3 (e.g. by the SDN controller 1). In step S10 the first element, i.e. the first application 4, in the service chain 3 operates on the packet, i.e. on the frame. Some applications 4 are able to extract metadata from the flow, while operating on the flow. Hence, in step S11, metadata can be extracted from the packet of the flow 9 by the first application 4, and the flow table 13 is accordingly updated with the extracted metadata. As described above, the flow table 13 may be located in the SDN controller 1, the external chaining module 11, or in a distributed manner in the applications 4. After the first application 4 finishes the processing of the packet (and independently if metadata was extracted or not in step S11) another application 4 (e.g. succeeding the first application 4) in the service chain 3 may operate on the packet (step S12). Some applications 4 may also query the flow table 13 for relevant metadata. If, for example, an application 4 determines that it requires relevant metadata it can query in step S13 the flow table 13. The application 4 can also store extracted metadata from the flow in step S14, and can accordingly update the flow table 13. Finally, in step S15 a further application 4 in the service chain operates on the packet, until all applications 4 in the service chain 3 have completed their operation on the flow.

Figure 10:
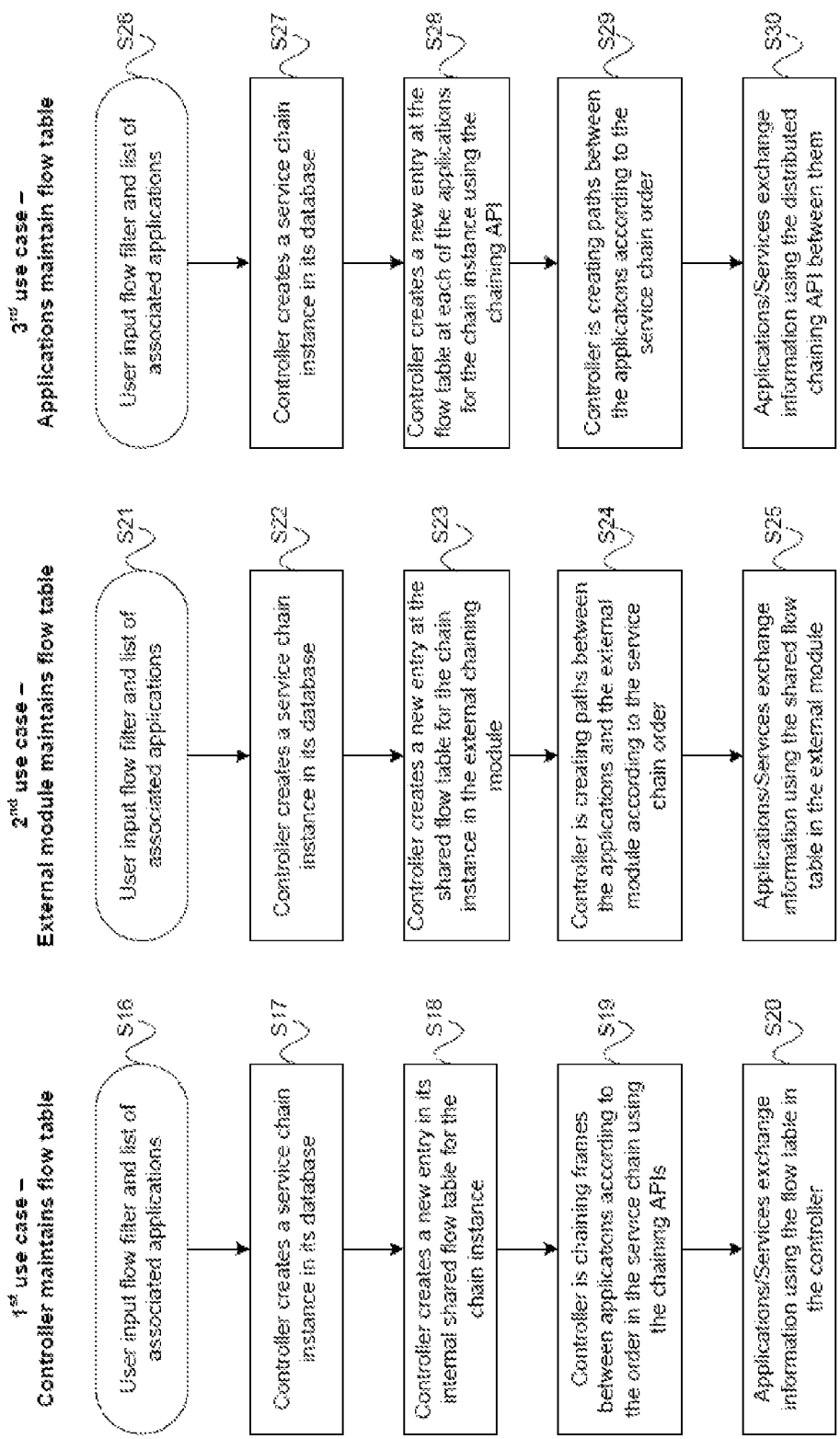
FIG. 10 shows flow diagrams illustrating how the service chain is maintained with the flow table being created in the SDN controller, a chaining module or being distributed over SDN applications, respectively.

FIG. 10 shows specifically how the service chain 3 created in the SDN controller 3 may be maintained by using the flow table 2, which may be created in the SDN controller 1, in the chaining module 11, or may be distributed over the applications 4, respectively.

In the first use case (left flow diagram of FIG. 10), at first, in step S16, a user may input a flow filter and a list of associated applications 4. Based on the applications 4 the SDN controller 1 can create, in step S17, a service chain 3, e.g. stored as routing scheme in its database. The SDN controller 1 may also apply the user (customer) defined filter to applications 4 of an existing service chain 3. In step S18 the SDN controller 1 then creates an entry in the flow table 13 for each application 4 (e.g. for storing information extracted by the application 4 from the flow) associated with the user. In the first use case the service data table 2 is installed in the SDN controller 1. Data traffic, e.g. a flow 9 comprising different frames or packets are then chained in step S19 between the applications 4 according to the order of the applications 4 in the service chain 3. The SDN controller 1 therefore uses the (chain) APIs 6 for connecting between applications 4 and service insertion points 7 of the service chain 3, and uses the dispatcher 8 for connections between service insertion points 7. In step S20 the applications or services may exchange information, e.g. about the flow 9, about micro-flows within the flow 9, or about changes and modifications to the flow 9 or the micro-flows, by using the flow table 13 installed in the SDN controller 1.

In the second use case (middle flow diagram of FIG. 10), at first, in step S21, a user may input a flow filter and a list of associated applications 4. Based on the applications 4 the SDN controller 1 can create, in step S22, a service chain 3, e.g. in its database. The SDN controller 1 may also apply the user (customer) defined filter to applications 4 of an existing service chain 3. In step S23 the SDN controller 1 then creates an entry in the flow table 13 for each service chain instance, i.e. for each application 4 associated with the user. In the second use case the flow table 13 is installed in the external chaining module 11. In step S24 the SDN controller 1 creates network paths between the applications 4 and the chaining module 11 according to the order of the service chain 3. Data traffic, e.g. a flow 9 comprising different frames or packets are then routed through the network paths. In step S25 the applications 4 may exchange information, e.g. about the flow 9, about micro-flows within the flow 9, or about changes and modifications to the flow 9 or the micro-flows, by using the flow table 13 installed in the chaining module 11.

In the third use case (right diagram of FIG. 10), at first, in step S26, a user may input a flow filter and a list of associated applications 4. Based on the applications 4 the SDN controller 1 can create, in step S27, a service chain 3, e.g. in its database. The SDN controller 1 may also apply the user (customer) defined filter to applications 4 of an existing service chain 3. In step S28 the SDN controller 1, by using at least one (chain) API 6, then creates an entry in the flow table 13 for each service chain instance, i.e. for each application 4 associated with the user. In the third use case the flow table 13 is distributed between the applications 4. In step S29 the SDN controller 1 may create paths for use as a message passing mechanism 12 between the applications 4 according to the order of the service chain 3. The message passing mechanism 12 may, for example, be implemented in the SDN controller 1 or in an external module, e.g. a chaining module 11 or another module. Data traffic, e.g. a flow 9 comprising different frames or packets are then routed through the applications 4 and the message passing mechanism 12. In step S30 the applications 4 use their (chain) APIs to exchange information, e.g. about the flow 9, about micro-flows within the flow 9, or about changes and modifications to the flow 9 or the micro-flows, by using the flow table 13 distributed between the applications 4.

In summary, the present disclosure provides a method and a controller for a SDN environment, wherein an awareness of the SDN controller 1 to the SDN applications 4 that are provided in the SDN is added, and a service chaining infrastructure is enabled by the SDN controller 1. Thereby, a more efficient and optimized chaining of different SDN applications 4 can be utilized, so that the applications 4 which run as network services over the SDN controller 1 can be ordered in a way that they do not interfere with each other and even use synergies. Thereby, the efficiency of the service chaining is improved, and the requirement for computation resources is reduced.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A method for chaining applications in a software defined network (SDN), the method comprising:
   creating a service data table in an SDN controller, wherein a plurality of applications is associated with a plurality of application types in the service data table;
   creating at least one service chain defining an order of application types in the SDN controller, wherein the order of the application types in the SDN controller is based on the application types to ensure that applications of different types do not interfere with each other; and
   registering at least one application to the at least one service chain based on the application type associated with the at least one application in the service data table.

2. The method according to claim 1, further comprising:
   exposing the at least one service chain and the service data table to applications through at least one application programming interface (API).

3. The method according to claim 1, further comprising:
   creating, in the at least one service chain, a plurality of service insertion points for applications, wherein each service insertion point accepts applications of one or more application types associated to the service insertion point.

4. The method according to claim 3, wherein each service insertion point is exposed to applications through at least one application programming interface (API).

5. The method according to claim 1, wherein the registering comprises:
   determining, by the SDN controller, the application type of the at least one application according to the service data table; and
   associating, by the SDN controller, the at least one application with at least one service insertion point according to the determined application type.

6. The method according to claim 5, wherein the registering comprises:
   creating, by the SDN controller, a new application type in the service data table, if the at least one application is determined not to be associated with an application type in the service data table; and
   associating, by the SDN controller, the at least one application with at least one service insertion point according to the created application type.

7. The method according to claim 1, further comprising:
   routing, by the SDN controller, at least one flow comprising at least one data packet according to the at least one service chain of applications.

8. The method according to claim 7, further comprising:
   extracting, by the at least one application, metadata from the flow, and storing the extracted metadata as information about the flow in a flow table.

9. The method according to claim 8, wherein the metadata extracted from the flow comprises an application type, a specific application ID, a user ID and/or a flow content ID.

10. The method according to claim 8, wherein the flow comprises frames, and the metadata extracted from the flow comprises frame information about each frame of the flow.

11. The method according to claim 10, wherein the frame information comprises one or more of a frame marked for dropping, a changed header, and previous header information.

12. The method according to claim 8, wherein a plurality of applications share the metadata stored in the flow table.

13. The method according to claim 8, wherein the flow table is created in the SDN controller.

14. The method according to claim 13, wherein the at least one flow is routed through the SDN controller according to the at least one service chain of applications.

15. The method according to claim 8, wherein the flow table is created in a chaining module connected to the SDN controller.

16. The method according to claim 15, further comprising:
    creating, by the SDN controller, network paths between the at least one application and the chaining module according to the order of application types defined by the service chain.

17. The method according to claim 16, wherein the at least one flow is routed through the chaining module and the network paths created by the SDN controller according to the at least one service chain of applications.

18. The method according to claim 8, wherein the flow table is distributed over the at least one application and a further application registered to the service chain.

19. The method according to claim 18, wherein the at least one flow is routed through the at least one application and the further application according to the at least one service chain of applications by using a message passing mechanism.

20. The method according to claim 8, further comprising:
    querying, by the at least one application, the flow table, in order to obtain the stored information about the flow.

21. The method according to claim 1, wherein creating the at least one service chain comprises:
    creating, by the SDN controller, a plurality of service chains; and
    customizing, by the SDN controller, each service chain for a different customer.

22. The method according to claim 8, further comprising:
    associating, by the SDN controller, a plurality of flows to the at least one service chain using user defined filtering.

23. A computer system, comprising a memory storing a software defined network (SDN) controller, for chaining applications in a SDN, wherein:
    a service data table is installed in the SDN controller, wherein a plurality of applications are associated with a plurality of application types in the service data table;
    at least one service chain defining an order of application types is implemented on the SDN controller, wherein the order of the application types in the SDN controller is based on the application types to ensure that applications of different types do not interfere with each other; and
    the SDN controller is configured to register at least one application to the service chain based on the application type associated with the application in the service data table.

24. The computer system according to claim 23, wherein the SDN controller is configured to create in the at least one service chain a plurality of service insertion points for applications, wherein each service insertion point accepts applications of one or more application types associated to the service insertion point.

25. The computer system according to claim 23, wherein the SDN controller is configured to:
   determine the application type of the at least one application according to the service data table; and
   associate the at least one application with at least one service insertion point according to the determined application type.

26. The computer system according to claim 25, wherein the SDN controller is configured to:
   create a new application type in the service data table, if the at least one application is determined not to be associated with an application type in the service data table; and
   associated the at least one application with at least one service insertion point according to the created application type.

27. The computer system according to claim 23, wherein:
   the SDN controller is configured to route at least one flow comprising at least one data packet according to the at least one service chain of applications; and
   a flow table is installed in the SDN controller, wherein in the flow table metadata extracted by the applications from the flow is stored as information about the flow.

28. The computer system according to claim 27, wherein:
   the flow table is created in the SDN controller; or
   the flow table is distributed over the at least one application and a further application registered to the service chain; or
   the system further comprises a chaining module connected to the SDN controller and the flow table is created in the chaining module.

29. A non-transitory computer readable storage medium having a program code stored thereon that, when executed, causes a computer system to chain applications in a software defined network (SDN), by performing the steps of:
   creating a service data table in an SDN controller, wherein a plurality of applications is associated with a plurality of application types in the service data table;
   creating at least one service chain defining an order of application types in the SDN controller, wherein the order of the application types in the SDN controller is based on the application types ensures that applications of different types do not interfere with each other; and
   registering at least one application to the at least one service chain based on the application type associated with the at least one application in the service data table.

* * * * *